United States Patent
Lundberg et al.

(10) Patent No.: US 9,767,190 B2
(45) Date of Patent: Sep. 19, 2017

(54) PATENT CLAIM SCOPE EVALUATOR

(71) Applicant: Black Hills IP Holdings, LLC, Minneapolis, MN (US)

(72) Inventors: Steven W. Lundberg, Edina, MN (US); Lars Olof Hugo Svensson, Plymouth, MN (US)

(73) Assignee: Black Hills IP Holdings, LLC, Minneapolis, MN (US)

( * ) Notice: Subject to any disclaimer, the term of this patent is extended or adjusted under 35 U.S.C. 154(b) by 0 days.

(21) Appl. No.: 14/259,900

(22) Filed: Apr. 23, 2014

(65) Prior Publication Data

US 2014/0317125 A1 Oct. 23, 2014

Related U.S. Application Data

(60) Provisional application No. 61/814,937, filed on Apr. 23, 2013.

(51) Int. Cl.
G06F 17/30 (2006.01)
(52) U.S. Cl.
CPC .............................. *G06F 17/30705* (2013.01)
(58) Field of Classification Search
None
See application file for complete search history.

(56) References Cited

U.S. PATENT DOCUMENTS

| 8,204,816 | B2 | 6/2012 | Brodsky et al. |
|---|---|---|---|
| 8,600,900 | B2 | 12/2013 | Lundberg |
| 9,135,211 | B2 | 9/2015 | Stern et al. |
| 2002/0022974 | A1 | 2/2002 | Lindh |
| 2002/0138384 | A1 | 9/2002 | Malackowski et al. |
| 2003/0212572 | A1 | 11/2003 | Poltorak |
| 2005/0071284 | A1 | 3/2005 | Courson et al. |
| 2006/0085249 | A1 | 4/2006 | Diaz et al. |
| 2006/0229983 | A1 | 10/2006 | Lundberg |
| 2007/0073625 | A1 | 3/2007 | Shelton |
| 2007/0239705 | A1 | 10/2007 | Hunt et al. |

(Continued)

OTHER PUBLICATIONS

"U.S. Appl. No. 13/422,750, Final Office Action mailed Jun. 15, 2016", 37 pgs.

(Continued)

*Primary Examiner* — Hung Q Pham
(74) *Attorney, Agent, or Firm* — Schwegman Lundberg & Woessner, P.A.

(57) ABSTRACT

Systems and methods for calculating a patent claim scope rating are disclosed. In an example embodiment, a method of calculating a patent claim scope rating includes identifying patent references cited in examination of a subject patent and storing the identified patent references as an applied art list, identifying first backward references for the patent references in the applied art list and storing the first backward references as a first backward list, identifying second backward references for the first backward references in the first backward list and storing the second backward references as a second backward list, identifying forward references for the patent references in the applied art list and storing the forward references as a forward list. A patent claim scope rating is based on a calculation including at least a partial combination listing of the applied art list, the first and second backward lists, and the forward list.

12 Claims, 6 Drawing Sheets

(56) References Cited

U.S. PATENT DOCUMENTS

| | | |
|---|---|---|
| 2007/0288856 A1 | 12/2007 | Butlin et al. |
| 2008/0154767 A1 | 6/2008 | D'agostino |
| 2008/0281748 A1 | 11/2008 | Newman |
| 2009/0012827 A1 | 1/2009 | Avrunin |
| 2009/0259506 A1 | 10/2009 | Barney |
| 2010/0030680 A1 | 2/2010 | Malackowski et al. |
| 2010/0057533 A1 | 3/2010 | Martinez Ruiz et al. |
| 2010/0082395 A1 | 4/2010 | De Andrade |
| 2010/0106752 A1 | 4/2010 | Eckardt, III et al. |
| 2010/0153282 A1 | 6/2010 | Graham |
| 2011/0288984 A1 | 11/2011 | Thomas |
| 2011/0320367 A1 | 12/2011 | Kan et al. |
| 2012/0278244 A1* | 11/2012 | Lee ............... G06Q 50/184 705/310 |
| 2012/0290487 A1 | 11/2012 | Lee et al. |
| 2012/0317041 A1* | 12/2012 | Shaffer ............ G06Q 90/00 705/310 |
| 2013/0085934 A1 | 4/2013 | Lundberg |
| 2013/0085948 A1 | 4/2013 | Lundberg |
| 2013/0085949 A1 | 4/2013 | Lundberg |
| 2013/0132302 A1 | 5/2013 | Lundberg et al. |
| 2013/0282599 A1 | 10/2013 | Kang et al. |

OTHER PUBLICATIONS

"U.S. Appl. No. 13/422,750, Final Office Action mailed Aug. 7, 2013", 29 pgs.
"U.S. Appl. No. 13/422,750, Non Final Office Action mailed Apr. 1, 2014", 32 pgs.
"U.S. Appl. No. 13/422,750, Non Final Office Action mailed Apr. 12, 2013", 19 pgs.
"U.S. Appl. No. 13/422,750, Non Final Office Action mailed Oct. 31, 2014", 32 pgs.
"U.S. Appl. No. 13/422,750, Response filed Jan. 30, 2014 to Final Office Action mailed Aug. 7, 2013", 13 pgs.
"U.S. Appl. No. 13/422,750, Response filed Feb. 2, 2015 to Non Final Office Action mailed Oct. 31, 2014", 11 pgs.
"U.S. Appl. No. 13/422,750, Response filed Jul. 12, 2013 to Non Final Office Action mailed Apr. 12, 2013", 14 pgs.
"U.S. Appl. No. 13/422,750, Response filed Sep. 2, 2014 to Non Final Office Action mailed Apr. 1, 2014", 10 pgs.
"U.S. Appl. No. 13/424,682, Non Final Office Action mailed Apr. 11, 2013", 6 pgs.
"U.S. Appl. No. 13/424,682, Notice of Allowance mailed Jul. 30, 2013", 13 pgs.
"U.S. Appl. No. 13/424,682, Response filed Jul. 5, 2013 to Non Final Office Action mailed Apr. 11, 2013", 10 pgs.
"U.S. Appl. No. 13/424,705, Advisory Action mailed Nov. 29, 2013", 3 pgs.
"U.S. Appl. No. 13/424,705, Final Office Action mailed Sep. 11, 2015", 28 pgs.
"U.S. Appl. No. 13/424,705, Final Office Action mailed Sep. 19, 2013", 11 pgs.
"U.S. Appl. No. 13/424,705, Non Final Office Action mailed Apr. 12, 2013", 14 pgs.
"U.S. Appl. No. 13/424,705, Non Final Office Action mailed Jun. 16, 2014", 21 pgs.
"U.S. Appl. No. 13/424,705, Non Final Office Action mailed Jul. 23, 2014", 21 pgs.
"U.S. Appl. No. 13/424,705, Response filed Jul. 12, 2013 to Non Final Office Action mailed Apr. 12, 2013", 11 pgs.
"U.S. Appl. No. 13/424,705, Response filed Nov. 19, 2013 to Final Office Action mailed Sep. 19, 2013", 11 pgs.
"U.S. Appl. No. 13/424,705, Respoonse filed Nov. 24, 2014 to Non Final Office Action mailed Jul. 23, 2014", 14 pgs.
"U.S. Appl. No. 13/679,830, Final Office Action mailed Jan. 31, 2014", 27 pgs.
"U.S. Appl. No. 13/679,830, Final Office Action mailed Apr. 23, 2015", 36 pgs.
"U.S. Appl. No. 13/679,830, Non Final Office Action mailed Jan. 4, 2016", 61 pgs.
"U.S. Appl. No. 13/679,830, Non Final Office Action mailed Jun. 14, 2013", 21 pgs.
"U.S. Appl. No. 13/679,830, Non Final Office Action mailed Nov. 6, 2014", 36 pgs.
"U.S. Appl. No. 13/679,830, Response filed Feb. 6, 2015 to Non Final Office Action mailed Nov. 6, 2014", 12 pgs.
"U.S. Appl. No. 13/679,830, Response filed Jun. 12, 2014 to Final Office Action mailed Jan. 31, 2014", 16 pgs.
"U.S. Appl. No. 13/679,830, Response filed Jul. 5, 2016 to Non Final Office Action mailed Jan. 4, 2016", 11 pgs.
"U.S. Appl. No. 13/679,830, Response filed Sep. 23, 2015 to Final Office Action mailed Apr. 23, 2015", 14 pgs.
"U.S. Appl. No. 13/679,830, Response filed Nov. 14, 2013 to Non Final Office Action mailed Jun. 14, 2013", 14 pgs.
"Patent Rank: A Network-Dominant Logic for Innovation", Submitted to Marketing Science, manuscript MKSC-Oct 10-0356, (Oct. 2010), 36 pgs.
Brinn; Michael W, et al., "Investigation of forward citation count as a patent analysis method", *Proceedings of the 2003 Systems and Information Engineering Design Symposium*, (2003), 6 pgs.
U.S. Appl. No. 13/969,384, Response filed Mar. 22, 2017 to Non Final Office Aciton mailed Sep. 22, 2016, 22 pgs.
U.S. Appl. No. 13/971,349, Final Office Action mailed Feb. 9, 2017, 32 pgs.
U.S. Appl. No. 14/281,513, Non Final Office Action mailed Mar. 27, 2017, 16 pgs.
U.S. Appl. No. 13/969,384, Non Final Office Action mailed Sep. 22, 2016, 45 pgs.
U.S. Appl. No. 13/971,349, Response filed Nov. 29, 2016 to Non Final Office Action mailed Jun. 29, 2016, 19 pgs.
Bitlaw, "37 CFR 1.53 Application Number, Filing Date, and Completion of Application", <http://www.bitlaw.com/source/37cfr/1_53.html>, Nov. 11, 2012, archived by Internet Archive Wayback Machine <https://web.archive.Org/web/20071111220937/http://www.bitlaw.com/source/37cfr/1_53.html>, viewed Sep. 9, 2016.

* cited by examiner

PATENT CLAIM SCOPE EVALUATOR

CLAIM OF PRIORITY

This application claims the benefit of priority, under 35 U.S.C. Section 119(e), of U.S. Provisional Patent Application Ser. No. 61/814,937 filed Apr. 23, 2013 ("PATENT CLAIM SCOPE EVALUATOR"), the content of which is incorporated herein by reference in its entirety.

BACKGROUND

The management of a patent portfolio involves multiple stages. Initially, a decision is typically made as to what inventions are worth the investment of filing a patent application. Each filed patent application typically then goes through prosecution with the patent office. Finally, for each patent that is allowed, maintenance fees are usually payable at a variety of intervals to keep the patent in force. In some instances, an inventor, business manager, or portfolio manager may wish to review or watch a patent to check for potential infringement of the patent by a competitor. Manual efforts to perform this task, including some evidence of infringement, can be time consuming and of limited scope.

When analyzing a patent or patent application it is important to find out what the scope, or breadth, of the claims are. Evaluation of patent claim scope has traditionally been performed by reading and construing each claim. This takes significant time and effort by a skilled professional. It is therefore desirable to use a solution that completes patent claim scope evaluation automatically.

SUMMARY

Disclosed herein are methods, systems and apparatus for analyzing and evaluating the claim scope breadth of a subject patent, issued or pending. According to one first embodiment there is provided a user interface for choosing a subject patent issued or pending and for the subject patent scope breadth to be evaluated by the invention upon a search for prior art and upon calculation of scope breadth algorithms. According to one second embodiment there is provided a user interface for choosing a set of subject patents issued or pending and for each of the subject patents' scope breadth to be evaluated by the invention upon search for prior art and upon calculation of scope breadth algorithms.

BRIEF DESCRIPTION OF DRAWINGS

Some embodiments are illustrated by way of example and not limitation in the figures of the accompanying drawings in which.

DETAILED DESCRIPTION

The life cycle of a patent may include multiple stages. These stages generally include invention, filing a patent application on the invention, prosecuting the patenting application to allowance or abandonment, determining whether to file any continuing applications, and paying maintenance fees on the allowed patent.

At each stage, one or more parties determine the best course of action to take with respect to the invention. For example, when determining whether or not to file a patent, the inventor may know what products are out in the technology area of the invention, a business manager may know how the invention fits in with a company's goals, and a patent attorney may have researched existing patents or applications in the technology area of the patent. These parties will ultimately decide whether it is worth the initial investment of filing an application on the invention and then determine the next course of action at each future stage.

In some instances, an inventor, business manager, or portfolio manager may wish to monitor the patent or business activities of one or more competitors. The provision of up-to-date information relating to cited references or changes in the art (such as internet or web material) to which a user's or competitor's patent portfolio relates may be particularly helpful in devising patenting strategy or making informed business or patent enforcement decisions.

In various embodiments, a patent management system includes tools to help the parties involved in the patenting process make decisions at each stage in the life of a patent. These tools may also be used for general research by parties not immediately involved with the patenting of the invention. These tools may be used as standalone tools, in combination with other tools, and in combination with other patent management systems. Examples of tools include, but are not limited to, prosecution analytics, patent and patent continuation analysis, reference management, prior art analytics, docketing management, claim mapping, claim analytics, portfolio analytics, external database (e.g., Patent Application Information Retrieval "PAIR") analytics, annuity management, strategic monitoring, and a white space indicator.

The systems, methods, and tools of the present disclosure set forth in this specification are described in relation to a patent management system and patent matters, but it will be understood that embodiments of the present invention could equally be applied to other forms of intellectual property (trademarks, copyright, utility models, petty patents, registered designs, and the like). Moreover, the term "patent" is not intended to be limited to an issued patent, but may include a pending patent application or un-filed application, invention disclosure or other type of intellectual property right. The term "user" or "registered user" is intended to cover any person interacting with the patent management system. A user may be an inventor, portfolio manager, business manager or patent attorney, for example. A "user" or "registered user" may also be an annuity payment service provider such as Computer Packages, Inc (CPI) or Computer Patent Annuities (CPA), for example. In the patent art, the term "annuity fees" can sometimes be used to refer to payments required to renew granted patents, while the term "maintenance fees" can sometimes be used to refer to payments required to maintain pending patent applications. In this specification, the terms "annuity fees" and "maintenance fees" are used interchangeably and refer to any kind of payment required to keep a patent or patent application (or other intellectual property right) in force.

Figure 1:
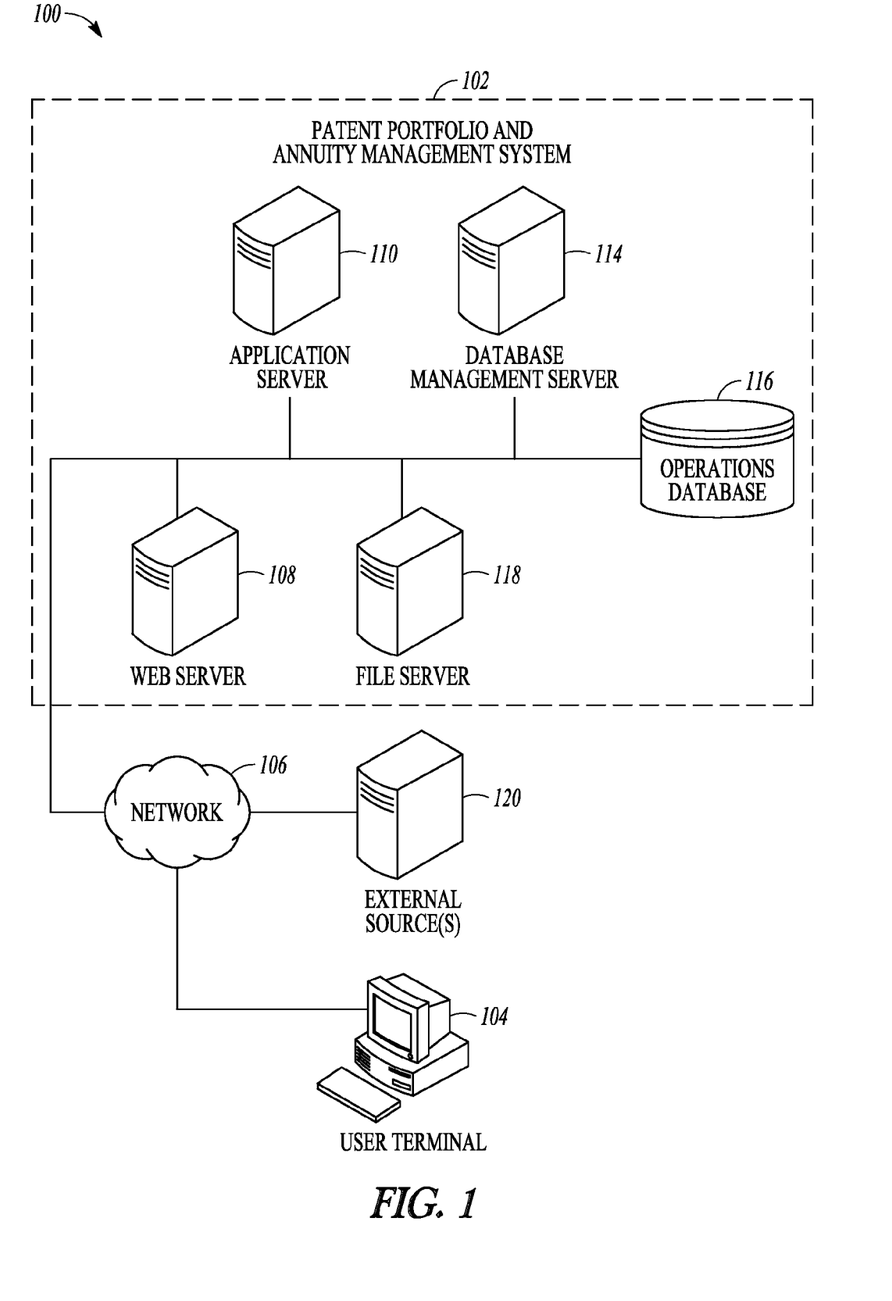
FIG. 1 is a schematic view of computer network system 100, according to various embodiments.

FIG. 1 is a schematic view of computer network system 100, according to various embodiments. The computer network system 100 includes a patent portfolio and annuity management system 102 (also called a portfolio management system 102, or annuity management system 102) and user terminal 104, communicatively coupled via network 106. In an embodiment, patent portfolio and annuity management system 102 includes web server 108, application server 110, database management server 114, which is used to manage at least operations database 116, and file server 118. Patent portfolio and annuity management system 102 may be implemented as a distributed system; for example, one or more elements of the patent portfolio and annuity management system 102 may be located across a wide area network (WAN) from other elements of patent portfolio and annuity management system 102. As another example, a server (e.g., web server 108, file server 118, database management server 114) may represent a group of two or more servers, cooperating with each other, provided by way of a pooled, distributed, or redundant computing model.

Network 106 may include local area networks (LANs), WANs, wireless networks (e.g., 802.11 or cellular network), the Public Switched Telephone Network (PSTNs) network, ad hoc networks, personal area networks (e.g., Bluetooth) or other combinations or permutations of network protocols and network types. The network 106 may include a single LAN or WAN, or combinations of LANs or WANs, such as the Internet. The various devices coupled to network 106 may be coupled to network 106 via one or more wired or wireless connections.

Web server 108 may communicate with file server 118 to publish or serve files stored on file server 118. Web server 108 may also communicate or interface with the application server 110 to enable web-based presentation of information. For example, application server 110 may provide scripts, applications, or library files that provide primary or auxiliary functionality to web server 108 (e.g., multimedia, file transfer, or dynamic interface functions). In addition, application server 110 may also provide some or the entire interface for web server 108 to communicate with one or more of the other servers in the patent portfolio and annuity management system 102 (e.g., database management server 114). Web server 108, either alone or in conjunction with one or more other computers in patent portfolio and annuity management system 102, may provide a user-interface. The user-interface may be implemented using a variety of programming languages or programming methods, such as HTML (HyperText Markup Language), VBScript (Visual Basic® Scripting Edition), JavaScript™, XML® (Extensible Markup Language), XSLT™ (Extensible Stylesheet Language Transformations), AJAX (Asynchronous JavaScript and XML), Java™, JFC (Java™ Foundation Classes), and Swing (an Application Programming Interface for Java™).

User terminal 104 may be a personal computer (PC) or mobile device. In an embodiment, user terminal 104 includes a client program to interface with the patent portfolio and annuity management system 102. The client program may include commercial software, custom software, open source software, freeware, shareware, or other types of software packages. In an embodiment, the client program includes a thin client designed to provide query and data manipulation tools for a user of user terminal 104. The client program may interact with a server program hosted by, for example, application server 110. Additionally, the client program may interface with database management server 114.

Operations database 116 may be composed of one or more logical or physical databases. For example, operations database 116 may be viewed as a system of databases, which when viewed as a compilation, represent an "operations database." Sub-databases in such a configuration may include a matter database, portfolio database, user database, patent reference document or prior art database, product database, watch database, and mapping database. The operations database 116 or any one of the sub-databases may include a registry of patent matters. Operations database 116 may be implemented as a relational database, a centralized database, a distributed database, an object oriented database, or a flat database in various embodiments.

Data stored in a first database may be associated with data in a second database through the use of common data fields. For example, consider entries in the patent database formatted as [Patent ID, Patent Number] and entries in the product database formatted as [Product ID, Product Name, Patent ID]. In this manner, a product entry in the product database is associated with a patent in the patent database through the Patent ID data field. In various embodiments, a product may be associated with more than one patent by creating multiple entries in the product database (one for each patent the product is associated with). In other embodiments, one or more patent reference documents may be associated with a patent by creating multiple entries in the patent database, for example. The formats and data field titles are for illustration purposes, and other names and formats may be used. Additionally, further associations between data stored in the databases may be created as discussed further herein.

During operation of patent portfolio and annuity management system 102, data from multiple data sources (internal and external) is imported into or accessed by the operations database 116. Internal sources may include data from portfolio management and annuity payment services affiliated with patent portfolio and annuity management system 102. External sources 120 may include websites or databases associated with foreign and domestic patent offices (e.g. PAIR at the United States Patent and Trademark Office (USPTO), assignment databases, World Intellectual Property Organization (WIPO), and International Patent Documentation Center (INPADOC). In an embodiment, annuity amounts due and annuity due dates for patent matters listed in a registry database are drawn directly from such data stored at a national patent office in electronic form. In various embodiments, the data is scraped and parsed from websites if it is unavailable through a database. The data may be gathered using API calls to the sources when available. The data may be imported and stored in the operations database 116 on a scheduled basis, such as weekly, monthly, quarterly, or some other regular or periodic interval. Alternatively, the data may be imported on-demand.

After data importation, the data may be standardized into a common format. For example, database records from internal or external sources 120 may not be in a compatible format with the operations database 116. Data conditioning may include data rearrangement, normalization, filtering (e.g., removing duplicates), sorting, binning, or other operations to transform the data into a common format (e.g., using similar date formats and name formats).

Figure 2:
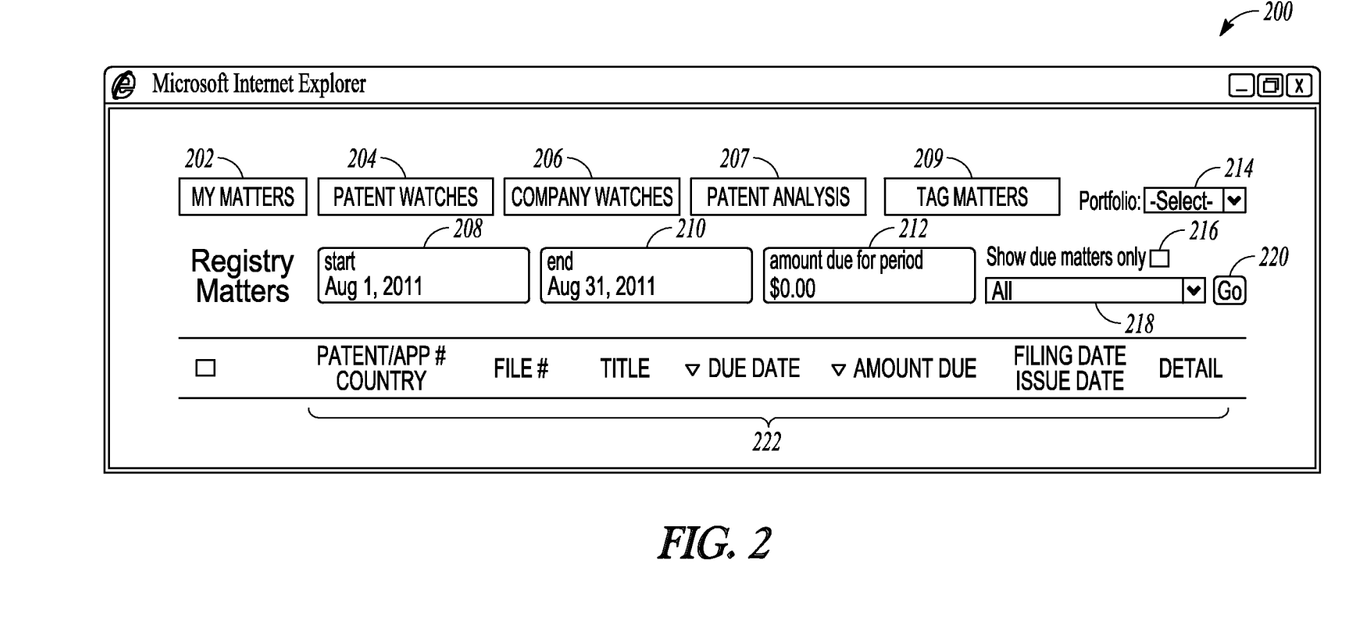
FIG. 2 is a user interface, as may be used in an example embodiment.

FIG. 2 is an example user interface 200 of patent portfolio and annuity management system 102 (FIG. 1). User interface 200 is illustrated with multiple user interface elements. In an example embodiment, a user interface element is a graphical or textual element with which a user may interact to cause an application to perform an assigned action for the interface element. Data representing user interface 200 may be transmitted via network 106 and presented on a display of user terminal 104 (FIG. 1) through the use of a web browser. A user (e.g., manager of a patent portfolio) may interact with the user interface elements of user interface 200 through the use of an input device (e.g., stylus, cursor, mouse, finger) of the user terminal 104. In an embodiment, a user selection is based on the coordinates of the input device as it makes contact with the display or where a user "clicks" the mouse. The coordinates are compared to the coordinates of the user input element to determine the selection. The type of user elements, names, and layout depicted in FIG. 2 are intended to be an illustration of an example user interface of patent portfolio and annuity management system 102. Other types of user elements, names, and layouts may be used.

The user interface elements may include my matters 202, patent watches 204, company watches 206, patent analysis 207, and tag matters 209. These elements may be used to select a context/view of the portfolio and annuity management system 102 (FIG. 1). For example, my matters 202 may list the patents included within a portfolio of a user, or list patent matters tagged for renewal by a user of an annuity registry database included, for example, in an operations database 116 (FIG. 1) of the type described above. Patent watches 204 may list information on patents that the user has indicated the management system 102 is to watch, and company watches 206 lists information on companies that the user has indicated the system should watch. Patent analysis 207 may allow a user to perform analysis on selected patent or patent continuation matters. Tag matters 209 may be selected to allow a user to tag or identify patent matters for management or payment of annuity fees. Tag matters 209 may also allow a user to identify a patent for the identification by the system of potentially relevant "web hits." Further details of each of these are included herein.

Date boxes 208 and 210 are user elements that allow a user to select a time period (for example, to select a display of patents having annuity fees due in that time period). Amount due box 212 displays the amount due with respect to annuities for patents in the portfolio of the user, or tagged or listed in a registry, within the period indicated by date boxes 208 and 210. Upon activating (e.g., clicking) one of the date boxes, a user may be presented with a calendar, which allows the selection of a date. Upon selecting a date, the date boxes will update to reflect the user's choice.

Drop-down menu 214 includes a list of portfolios or registry listings that a user of the patent portfolio and annuity management system 102 (FIG. 1) is authorized to view. For example, before user interface 200 is displayed, a login screen requesting a user ID and password may be presented to the user. In various embodiments, the user ID is associated with one or more portfolios. In turn, each portfolio is associated with one or more matters. Matters may include US and foreign issued patents (including divisionals, continuations, and so forth), pending patents, abandoned patents, and not yet filed applications. Thus, upon selection of a portfolio using drop-down menu 214, user interface 200 is populated with matters associated with the portfolio or registry listing.

Checkbox 216 is an option to only display matters that currently have an annuity due. Drop-down menu 218 allows further filtering of matters. For example, the matters may be filtered by US patents only, by US patent applications, and by foreign applications only.

In various embodiments, activation of button 220 updates user interface 200 to reflect the choices made by the user with respect to date boxes 208 and 210, checkbox 216, and drop-down menu 218. For example, the amount due box 212 will be updated to reflect the amount due within the new period, and the matters listed under column headings 222 may be filtered. In various embodiments, user interface 200 is updated as the user selections are made with respect to elements 208 to 218 without activating button 220.

Figure 3:
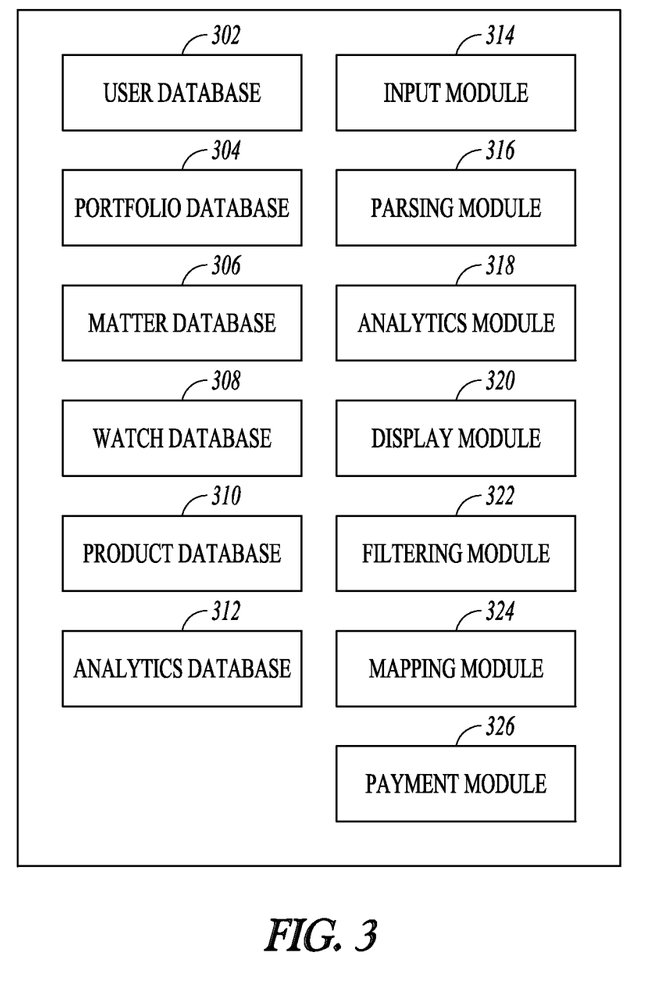
FIG. 3 is a block diagram of a system, according to example embodiments.

FIG. 3 is a block diagram of patent portfolio and annuity management system 102 (FIG. 1), according to an example embodiment. Illustrated are user database 302, portfolio database 304, matter database 306, watch database 308, product database 310, analytics database 312, input module 314, parsing module 316, analytics module 318, display module 320, filtering module 322, mapping module 324, and payment module 326. In various embodiments, the data stored in databases 302, 304, 306, 308, 310, and 312 may be in the same or multiple physical locations. For example, portfolio database 304 may be located in one or more computers associated with a portfolio management service. In various embodiments, patent portfolio and annuity management system 102 (FIG. 1) may mirror databases stored in other locations. In an embodiment, when a request is made to access data stored in the databases, patent portfolio and annuity management system 102 determines where the data is located and directs the request to the appropriate location.

In an example embodiment, user database 302 stores data representing users of patent portfolio and annuity management system 102 (FIG. 1). The data may represent authorized or registered users that are registered to use the patent matter registry database, for example. The data may include data fields of user credentials, including a user ID and password, and access rights with respect to the management system 102. The user ID may be the same as the user ID of other systems associated with patent portfolio and annuity management system 102. For example the user ID may be used in a portfolio management system 102. In this manner, access rights of the user with respect to the portfolio management system 102 may follow to the patent portfolio and annuity management system 102. In various embodiments, each user ID is associated with one or more portfolio IDs. Thus, when a user logs into the patent portfolio and annuity management system 102, the user is presented with access to only the portfolios that have been associated with that user ID. More or fewer data fields associated with a user may be included in a user entry stored in user database 302.

Portfolio database 304, in an example embodiment, stores data representing portfolios of one or more matters. A matter may include foreign or domestic issued patents in addition to applications. Data stored in portfolio database 304 may have been initially generated in a portfolio management system and imported into patent portfolio and annuity management system 102 through the use of one or more API calls or direct access to the data in the portfolio management system. In various embodiments, a portfolio may be generated by a user using the patent portfolio and annuity management system 102. For example, a user interface may be presented to the user requesting a portfolio name and the identifiers of matters to be included in the portfolio. In an embodiment, a portfolio entry in portfolio database 304 includes the data fields of portfolio ID and portfolio name. Additionally, a data field for matter ID may also be included in an entry in the portfolio database. Thus, each portfolio may be associated with one or more matters through the use of the matter ID data field. More or fewer data fields associated with a portfolio may be included in a portfolio entry of portfolio database 304.

In an embodiment, matter database 306 stores data representing matters. Each matter may be associated with one or more portfolios as well as one or more watches. In some embodiments, a matter is associated with no portfolios or watches. In an embodiment, a matter entry includes data fields representing a matter ID, title (e.g., the name of the patent or application), type of the matter (e.g., application, issued patent, Patent Cooperation Treaty (PCT) application), status of the matter (e.g., issued, abandoned, allowed), a link to the patent office where the matter was filed, a link to a PDF download of the matter, abstract of the matter, inventors of the matter, current owner of the matter, cited references on the face of the matter, filed date, issue date, docket number, and annuity information (e.g., due date, country, and amount due). In some embodiments, other patent reference documents or prior art in any form may be stored and associated with one or more matters. More or fewer data fields associated with a patent may be included in a matter entry stored in matter database 306. In an example embodiment, matter database 306 may store a patent matter database, wherein this database includes data about the patent matters. The data may include, for at least one patent matter, a claim set or statement of invention and a priority date for the claim set or statement of invention. Matter database 306 may also store a database of prior art documents (also known as "references"), wherein the prior art database includes data about the prior art documents. The data may include, for at least one prior art document, a priority date or publication date of the document. One or more of the prior art documents may be associated with a first patent matter in the patent matter database.

In various embodiments, a matter is associated with one or more other matters as a family with a family ID. Family members may be priority documents, continuation patents/applications, divisional patents/applications, and foreign patent/application counterparts. In an embodiment, family information is determined according to an external source such as INPADOC. Patent reference documents and/or other prior art may be manually or automatically stored, cross-cited, and associated with related family matters, for example.

In an embodiment, watch database 308 stores data representing user preferences with respect to objects that the user wants to track (e.g., watch). In an embodiment, an object is a company or a matter. With respect to matters, a user may indicate a preference to track the matter for any forward citations within a time period (e.g., 60 days, 3 months, etc.). Thus, watch database 308 may store entries with a watch ID that is associated with a user ID and a matter ID. With respect to companies, a user may indicate a preference to watch for publications or issued patents with an associated time period. Thus, watch database 308 may store entries with a watch ID, a user ID, and a company name. In various embodiments, the watches are user ID specific such that no matter what profile the user is viewing, the watches do not change.

In an embodiment, product database 310 stores data representing products. The products may be actual products manufactured by the user, products yet to be released, planned products, products covered in a licensing agreement, or a fictional product. In various embodiments, product database 310 stores entries with a product ID and product name, which are associated with a user ID. In various embodiments, a user may tag a product as associated with a matter. Thus, an entry in the product database 310 may also be associated with a matter ID. In an embodiment, one or more products stored in the product database 310 may be mapped to one or more matters stored in the matter database 306.

In various embodiments, analytics database 312 stores data representing information on matters and companies associated with patent portfolio and annuity management system 102 (FIG. 1). This information may be organized according to an individual matter, a portfolio, a family, or company. The information may be gathered from internal or external sources 120 of patent portfolio and annuity management system 102 or may be generated by examining the data stored in one or more databases of the management system 102.

In various embodiments, information for an individual matter may include status (e.g., disclosure received, drafting, filed, completed-waiting examination, in prosecution, allowed, issued), cited prior art, list and type of rejections (e.g., 35 U.S.C. §101, 102, 103), number of claims allowed, office action count, interviews held, Information Disclosure Statements (IDSs) filed, attorney fees to date, and PTO fees to date. Further metrics for an individual matter stored in analytics database 312 may include time waiting for examiner, total time in examination, time waiting for PTO while in examination, and time on appeal. An additional prosecution details formatter may include upcoming docket dates (e.g., due dates for office action, IDS due dates, etc.). A claim prosecution history chart may also be stored in analytics database 312 for each matter. The prosecution history may include a history of claim amendments and arguments made in prosecution.

In various embodiments, analytics for an individual matter may also include data representing a claim chart. The claim chart may include one or more scope concepts on one axis and claims on the other axis. In an embodiment, a scope concept is a textual description of what a patent claim is at least limited to. Thus, if a claim comprises A, B, and C, a scope concept may be A. In various embodiments, a scope concept for the claim may be broader than A because the claim will still be limited to the broader scope concept. In an embodiment, the claim charts store mappings between claims and scope concepts. The claim chart may include a variety of levels of granularity of scope concepts. Some claims may be mapped to all of the scope concepts while others may not be mapped to any scope concepts. In various embodiments, the mappings may have already been generated in a program external to the management system 102 (FIG. 1) (e.g., a portfolio mapping system). In various embodiments, claim charts may be combined at the portfolio level. Thus, a portfolio level chart may include scope concepts for all the claims (or, in some examples, only the independent claims) in the portfolio.

In various embodiments, portfolio and family analytics information may be stored in analytics database 312 based on aggregating the metrics for an individual matter. In an embodiment, the analytics of a family may differ from those in a portfolio since not all family member matters may be part of a portfolio. Additionally, the analytics may be stored for multiple time periods such that comparisons may be made between current metrics and metrics from a year ago (or other time period).

Aggregated metrics may include total patents and applications, pending and waiting for examination, in prosecution with no claims allowed, in prosecution with some claims allowed, appealed, notice of allowance received, and issued. These metrics may be compiled for both US and international matters in the portfolio. Additional information may include the international portfolio distribution by country.

An age distribution of the portfolio may also be compiled. For example, the portfolio may be broken down by less than one year old, 1 to 3 years old, 3 to 5 years old, 5 to 10 years old, 10 to 20 years old, and 20 or more years old. Recent filing and issue activity as well as upcoming foreign filing deadlines may be stored in analytics database 312.

In various embodiments, prosecution metrics across a portfolio or family are determined and stored in analytics database 312. This data may include matters waiting for examination, matters in examination, matters appealed, and cases allowed but not yet issued. Analytics with respect to office actions may also be compiled and stored. For example, success of allowance after a first office action response, a second response, and the like, may be stored in analytics database 312. Additional prosecution analytics may include allowance rate (e.g., 10%) after a telephone interview, allowance after an in-person interview, percentage of interviews with response, number and type of rejections, average time in prosecution (e.g., in months), average time to file a response, and average time to next office action. Further, the list of recently allowed cases, recently appealed cases, stalled cases, and recently abandoned cases may also be stored for each portfolio and family in analytics database 312.

In various embodiments, data stored in the database for a group of matters in a portfolio or family is analyzed to determine the top (e.g., ten) most cited patents, top most cited inventors, top most cited prior art owners (e.g., according to assignment documents or the face of the patent), newly (e.g., within the last 60 days) cited prior art owners, and top most cited prior art inventors. This information may be stored in analytics database 312.

In various embodiments, annuity cost information regarding cost projections for both US issued patents and international patents may also be stored. Upcoming foreign filing deadlines with respect to annuities may also be stored in analytics database 312.

In various embodiments, the results of keyword analysis on one or more matters and/or prior art references may be stored in analytics database 312. The keyword analysis may be based on the occurrences of the keywords in the matter or references to derive a score or keyword overlap.

In various embodiments, input module 314 receives data from multiple sources so that it may be further processed by one or more other modules and stored in one or more of databases 302-312. For example, input module 314 may be configured to utilize one or more APIs to collect data from one or more external sources 120 (FIG. 1) (e.g., public PAIR, private PAIR, INPADOC, foreign patent offices, patent docketing systems, portfolio management systems, etc.). The data may include published patent documents (for example, published claims of a patent), issued patent documents (for example, granted claims of a patent), patent applications, office actions or other patent office correspondence, prior art references, claim mappings, dockets dates, and annuity payment data.

In various embodiments, input module 314 is configured to receive input from one or more user interface elements. For example, the patent portfolio and annuity management system 102 (FIG. 1) may present multiple user interfaces to users. These user interfaces may enable users to input data directly into databases 302-312, instruct the management system 102 to retrieve data from patent data stores, and instruct the management system 102 to perform various operations on the data in databases 302-312.

Additionally, input module 314 may be configured to determine the selection of one or more user interface elements by a user and initiate the action associated with the selected user interface element. For example, a user interface element may include a drop-down menu to select a portfolio. Input module 314 may be configured to receive a selection of the portfolio and a drop-down menu. Then, input module 314 may pass the selection to one or more other modules for further processing. For example, display module 320 may update the drop-down menu to indicate the selection of a portfolio.

In various embodiments, parsing module 316 takes the data that has initially been inputted by input module 314 and formats it according to the data fields of databases 302-312 as discussed above. For example, consider a patent publication that has been input by input module 314. Parsing module 316 may use a combination of automatic image recognition and text analysis to determine the filing date, issue date, title, abstract, and claims of the patent. In some embodiments, parsing module 316 may flag certain pieces of data that had been determined to be potentially inaccurate (e.g., a number that could not be read). A user of patent portfolio and annuity management system 102 may then examine the flagged data and manually enter in the information.

The resulting data that has been parsed by parsing module 316 may then be entered as an entry in one or more of databases 302-312. This may be accomplished by, for example, formulating a SQL query with the parsed information. In various embodiments, parsing module 316 may parse multiple pieces of information before generating a database entry. For example, input module 314 may receive a docket number for an issued patent. The docket number may be combined with the information parsed from the issued patent to form an entry in matter database 306.

In various embodiments, analytics module 318 is configured to examine and run calculations on the data stored in the databases 302-312 to generate the analytics discussed previously. For example, analytics module 318 may formulate a SQL query that retrieves the number of times that a prior art reference has been cited within a portfolio. This query may be run for each prior art cited within the portfolio to determine a list of the most cited (e.g., the top ten) prior art references within a portfolio. In an embodiment, the queries are formulated and run as requested by a user. In an embodiment, once the analytics information has been determined, it is stored within analytics database 312. In various embodiments, queries are formulated and run on a period basis (e.g., nightly) and entries in analytics database 312 may be updated to reflect any changes.

In an embodiment, display module 320 is configured to display user interfaces and information retrieved from one or more databases 302-312. For example, display module 320 may generate user interface 200 of FIG. 2. If a user is accessing patent portfolio and annuity management system 102 (FIG. 1) remotely (e.g., through a web browser), display module 320 may be configured to transmit data representing a user interface through a network to a user terminal 104 (FIG. 1). In various embodiments, display module 320 is configured to generate one or more charts of data stored in databases 302-312. For example, display module 320 may generate a pie chart of the top 10 inventors within a portfolio.

In various embodiments, filtering module 322 is configured to filter a set of matters according to a user preference. For example, a user may activate a check box that indicates only pending matters should be shown in a user interface. Filtering module 322 may formulate a query consistent with retrieving only pending matters. The results of the query may then be shared with display module 320, where the user interface may be updated.

In various embodiments, mapping module 324 is configured to receive or generate mappings from a product to a matter. This may be accomplished, for example, by receiving a selection of a product and a matter by the user. The product may be one or more of the products stored in product database 310. In various embodiments, mapping module 324 is configured to present an automated mapping of the product to a matter for the user to confirm or deny. For example, mapping module 324 may present a claim chart for an issued patent to a user. As discussed, the claim chart includes one or more scope concepts to which one or more of the claims of the patent are limited. In conjunction with input module 314, mapping module 324 may receive selections of the user of one or more of the scope concepts that are potentially affiliated with the product. Thus, a comparison may be made between what the claims are limited to and what the product may be. For example, if a product, as defined by the selection of one or more scope concepts by the user, is affiliated toward scope concepts A, B, and C, and claim 1 of the patent has been mapped to scope concepts A, B, and C, the mapping module 324 may present an option to map the product to the patent. In various embodiments, the user may override this recommendation and select to not map the product to the patent. Similarly, a user may indicate that a product is affiliated with the patent even if the scope concepts do not match.

In various embodiments, the mapping module 324 is configured to receive or generate mappings from prior art to a matter. This may be accomplished, for example, by receiving a selection of prior art and a matter by the user. The selection of the prior art may be based on cited references or through other external prior art search. The selections may be conducted manually, by a user, or automatically, by analytics module 318, for example. In various embodiments, mapping module 324 is configured to present an automated mapping of the prior art to a matter for the user to review. In various embodiments, the mapping module 324 can be configured to carry out any of the keyword analysis described above in relation to analytics module 318, or to map products stored in product database 310.

In an embodiment, once the product or prior art mapping information has been determined, it is stored within analytics database 312 or matter database 306. In various embodiments, queries are formulated and run on a periodic basis (e.g., nightly), and entries in analytics database 312 or matter database 306 may be updated to reflect any changes.

In various embodiments, payment module 326 is configured to receive selections, or tags, by the user of which annuities to pay for matters in a portfolio or registry listing, for example. Additionally, payment module 326 may receive user preferences related to the payment of the annuities. Payment module 326 may receive payment information from a user and forward the payment information to the appropriate agency/office. In some embodiments, the annuity management system 102 (FIG. 1) organizes payment of the annuity on behalf of the user, and the user pays patent portfolio and annuity management system 102.

Any one of the databases 302-312 or modules 314-326 described above may be used or configured partially or entirely (either singly or in combination) as appropriate to perform one or more of the patent management functions described herein, or as set forth below in the following method steps.

Figure 4:
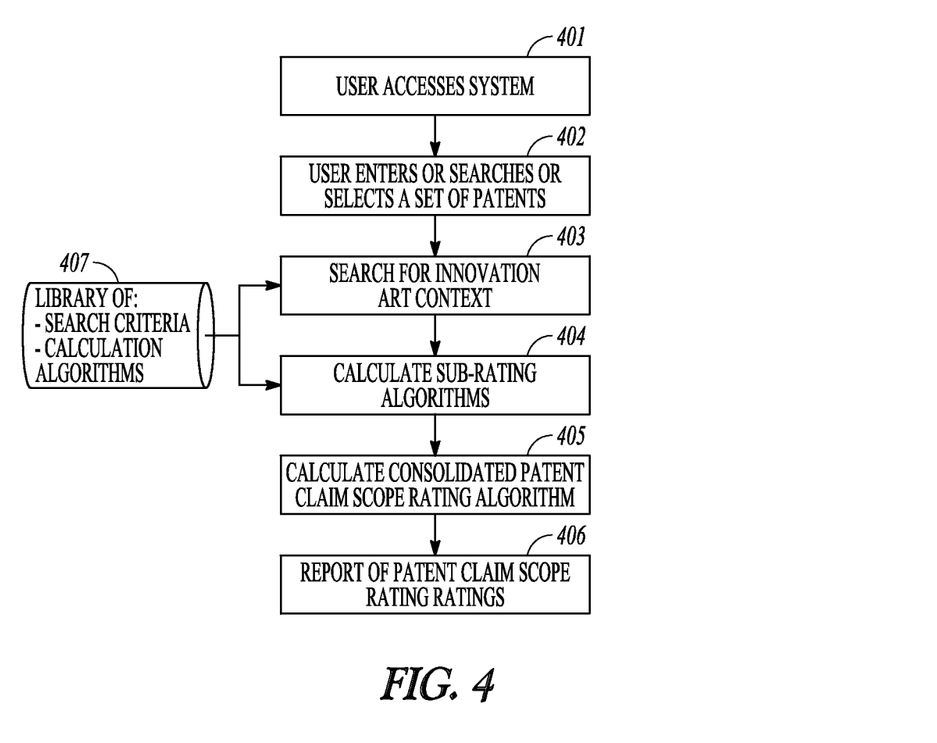
FIG. 4 is a flow chart showing a method, according to an example method embodiment.
Figure 5:
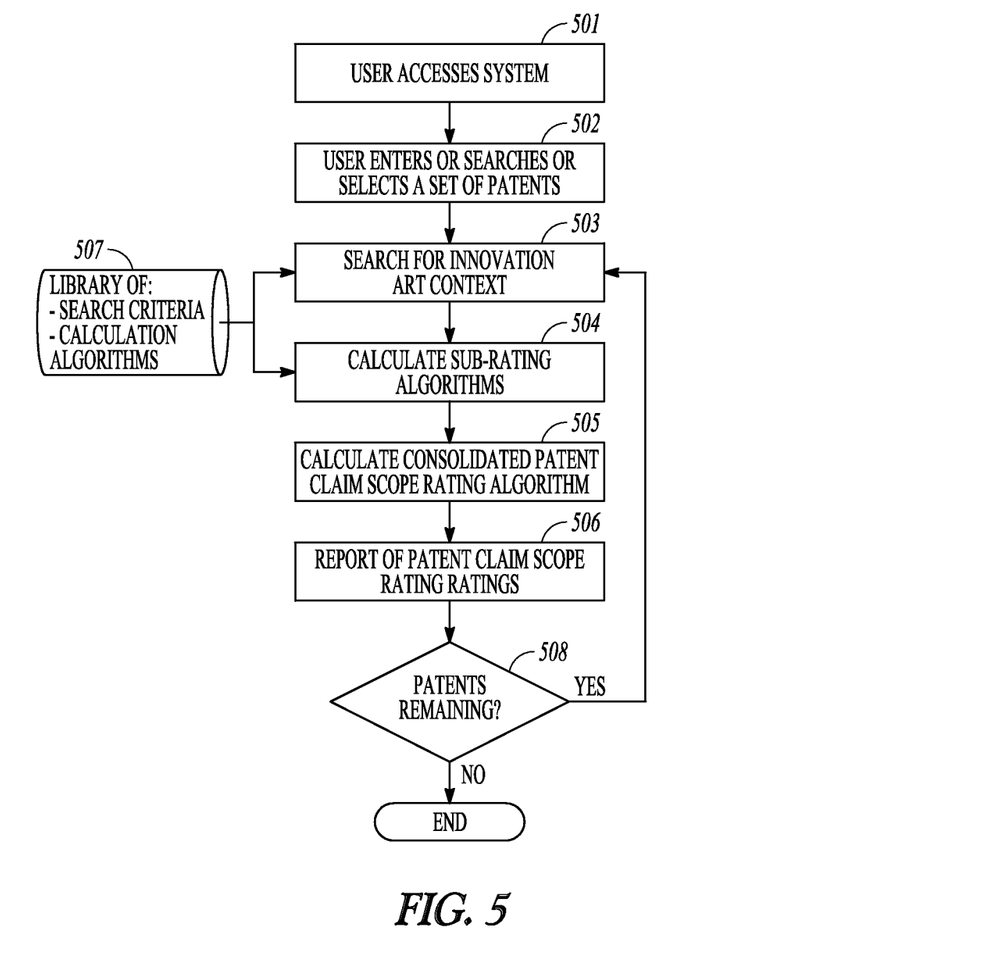
FIG. 5 is a flow chart showing a method, according to an example method embodiment.

Reference is now generally made to the subject matter of FIGS. 4 and 5 of the accompanying drawings. By way of general background, when a new patent application is filed for an invention, the potential scope breadth of the application's claims is determined by the prior art. In the case where there is minimal or no prior art the inventor can formulate broad claims for the invention. In the case where there is already substantial prior art the inventor is constrained by the prior art, and therefore has to formulate more narrow claims. A patent with broad claims is more valuable and therefore more desirable than a patent with narrow claims because broad claims confer a broader exclusivity to practice the invention.

When working with patents and/or patent applications it is therefore important to quickly and easily analyze and understand whether a patent or patent application has the potential for broad scope or for narrow scope. For patents, quick and easy scope analysis is important for evaluating the scope of a single patent and also for evaluating the aggregate scope of a set of patents. For patent applications, quick and easy scope analysis is important for prioritizing and preparing invention related documents before filing the patent application and for making decisions during patent prosecution. These priorities and preparations include but are not limited to choosing subjects for research and development, choosing invention disclosures for preparing patent applications, for writing a patent application and for making decisions regarding claims scope during patent prosecution. Quick and easy patent claim scope analysis is very valuable because it gives information needed to make important decisions regarding inventions and patents. Clear understanding of potential patent claim scope enables allocation of money, people and tool resources better to optimize the outcome of using patents.

The present invention automatically analyzes information related to a subject patent, or set of patents, and calculates a patent claim scope rating without the need for a person to read and construe the subject patent's claims. The invention thereby provides for the ability to make decisions based on claim scope in situations where the cost for traditional claim scope analysis has made decision so based too costly. This new ability is foreseen to cause a further focus and optimization regarding the use of patents by both improving the quality of patents granted and by reducing the total cost for acquiring high value patents. The present invention calculates claim scope rating information describing a patent's or application's potential claim scope. Claim scope rating is derived and calculated from information about patents and applications, as well as non-patent publications, within a technology.

The potential scope of a patent claim for an invention is broad if there is only minimal or no prior art. If, on the other hand, a prior art investigation would reveal that the invention is found in the context of many other prior patents in the same technology, we find that the potential scope of new patent claims is narrow. Generally, the later an invention is made within a technology the narrower its claims will be.

In this specification, "invention art context" is defined as one certain body of art which is found when performing a certain prior art search for one invention. "Invention space" is defined, at each point in time and for one technology, as potential inventions that can be patented and that are not anticipated by prior art. The inventive space within a technology, that allows inventions and subsequent patent filings, is over time consumed by disclosures. The first patent in an invention art context has few constraints. Every subsequent patent will be written within the constraints defined by all previous disclosures.

For the first patent in an invention art context there exists no patent prior art, and no or only minimal non-patent art in the form of non-patent publications. Patents filed subsequent to the first patent, but close in time to the first patent, are anticipated by the teaching of preceding patents in the patent art context. Later in time and sequence, succeeding patent applications are constrained by all previous disclosures. The later the application is filed the more constrained it is with respect to claim scope.

When products or product announcements based on an invention are first launched within a technology, and particularly when these products are commercially successful, we find an increase in public non-patent disclosures. These disclosures quickly reduce the opportunity to acquire patents with broad claims in the technology. For inventions and technologies we see a repeatable sequence:

- A first original invention leads to a first patent application with the potential to have broad claims.
- Several subsequent inventions allow only narrower claims due to the disclosure of the first invention, particularly when the original invention's patent filing and its prosecution have been performed well resulting in broad claims. The later in time and sequence an application in the invention art area is made, the narrower the claims will be.
- After an original innovation's commercial launch an increase of public disclosures, particularly non-patent publications, is found because the broader public becomes aware of the invention art area.
- Subsequent inventions within the technology lead to patent applications with comparatively narrow claims because the scope of claims for these inventions becomes restricted by a large number of preceding disclosures.

Early inventions and patent applications within an invention art context are desirable because their broad claim scope potential leads to higher value. The narrower scope of later filings in the invention art context makes these patents less valuable and therefore less desirable. Potential scope breadth for claims narrows the later the patent applications have been filed relative the first invention in the technology. When analyzing claim scope breadth we depend on our understanding of the invention art context.

Here is an example showing that patent claim scope is relative to the scope of the technology area considered. Say, for example, an invention discloses a particular method for low power use when calculating the GPS position of a mobile computing device. A patent for this invention may have relatively broad claims if this is the first patent disclosing this way of reducing power consumption for GPS calculation. We here consider "calculating GPS position in devices for mobile use (low power required)" as the invention art context for analysis. A patent for the same invention may at the same time be considered to have relatively narrow claims when the invention art context to be considered is "applications within mobile computing devices" because this is a much broader technology area. Patent claim scope rating is dependent on the technology scope of the analysis, and within which the claim scope is evaluated.

In some examples, the user enters, searches for, or selects information about a certain subject patent, granted or pending. In some examples, the user enters, searches for, or selects information about a set of subject patents, granted or pending. Entry of subject patent or patent set information may be otherwise performed including but not limited to data transfer from other system or systems. Subject patent information entered, searched, or selected by user includes but is not limited to:

Number
Bibliographic information
Title
Abstract
Specification text
Claims
Status
Patent prosecution file wrapper information
Patent family information
Patent's cited references information
Information regarding requests for continued examination
Information regarding re-examination
Information regarding litigation The subject patent is analyzed for potential patent claim scope breadth within its invention art context. Evaluation of claim scope is then performed against the body of disclosures within this inventions art context. The invention art context is created by performing a search for disclosures to be considered. This search is performed using a set of configurable search criteria called Disclosures Selection Criteria. Search criteria for including disclosures into a list of art defining an invention art context may be based on but are not limited to disclosures selection criteria:

Key elements of the technology disclosed in the patent
Title and Description of the patent
Keywords, with importance ratings for each keyword
Subclasses the patent is in
"Date First Publically Known" for the technology
Earliest Known Representative Patent(s) for the technology
Earliest Known Representative Patent's(s') ascendant and descendant family members
Citations by examiner
Common Citation Documents, CCD
Backward and forward references from patents found in other selection criteria
Content correlation between subject patent and disclosures within the invention art context, as determined by calculating correlation using natural language processing or other content correlation method The resulting list of art is a subject invention's invention art context. The invention art context information is further evaluated for subject patent claim scope by calculating at least one Claim Scope Algorithm from a set of algorithms including but not limited to at least one algorithm. Each Claim Scope Algorithm outputs a set of data that is called a Sub-Rating. Each Sub-Rating may include but is not limited to a number.

Claim Scope Algorithms are used for determining potential claim scope and may include but are not limited to:

Time passed between "Date First Publically Known" and the subject patent
Number of preceding patent disclosures in the invention art context
Closeness of connection between the analyzed patent and preceding patents, based on:
Amount of direct keyword overlap, or indirect keyword overlap, that signifies closeness of reference to Target Technology
Connection vis a vis the subclass the subject patent is in
Any connections to Earliest Known Representative Patent
Reference relationships between patent disclosures preceding the invention Number of Earliest Known Representative Patent(s) found Number of patent reference sequence steps before the subject patent Ratio of patent references to non-patent references Number of patents cited by examiner Reference relationships between the subject patent and subsequent patents and applications referencing the subject patent Content correlation between subject patent and disclosures within the invention art context, as determined by calculating correlation using natural language processing or other content correlation method Claim Scope Algorithms are evaluated to create a set of Sub-Ratings. The set of Rub-Ratings is consolidated into one set of consolidated data called the Patent Claim Scope Rating by evaluating a Patent Claim Scope Rating algorithm which may include but is not limited to an arithmetic sum of Sub-Ratings. The Patent Claim Scope Rating set of data may include but is not limited to a number.

Specific reference is now made to FIG. 4 of the accompanying drawings. In a first example embodiment of the inventive subject matter disclosed herein a method and system allows for automatic analysis of a patent's potential claim scope. This functionality may be operated by a user or may be otherwise controlled. The user accesses the Claim Scope Evaluator UI by activating a control in a User Interface (UI) 401. The user enters, searches for, or selects information about a certain subject patent, granted or pending. Subject patent's information is stored in the system 402. The system performs searches and extractions using a set of Disclosures Selection Criteria compiling a list of disclosures that is the subject patent's invention art context 403. The system selects a set of Claim Scope Algorithms from a library 407 for calculating Sub-Ratings for the subject patent claims' potential scope. The system evaluates selected Claim Scope Algorithms which produces a set of Sub Ratings including one Sub-Rating for each Claim Scope Algorithm used. The system calculates a consolidated Patent Claim Scope Rating for the subject patent by calculating a Patent Claim Scope Rating algorithm for the set of Sub-Ratings 405. The system outputs a report for the Patent Claim Scope Rating 406.

Reference is now made to FIG. 5 of the accompanying drawings. In another example embodiment of the inventive subject matter disclosed herein a system and method allows for automatic analysis of potential claim scope for a set of patents. This functionality may be operated by a user or may be otherwise controlled. The user accesses the Claim Scope Evaluator UI by activating a control in a User Interface (UI) 501. The user enters, searches for, or selects information about a certain subject patent, granted or pending. Subject patents' information is stored in the system 602. For each subject patent the system addresses, the system performs searches and extractions for using a set of Disclosures Selection Criteria compiling a list of disclosures that is the subject patent's invention art context 503. The system selects a set of Claim Scope Algorithms from a library 507 for calculating Sub-Ratings for the subject patent claims' potential scope. The system evaluates selected Claim Scope Algorithms which produces a set of Sub Ratings including one Sub-Rating for each Claim Scope Algorithm used. The system calculates a consolidated Patent Claim Scope Rating for the subject patent by calculating a Patent Claim Scope Rating algorithm for the set of Sub-Ratings 505. The system outputs a report for the Patent Claim Scope Ratings 606.

In another example embodiment of the inventive subject matter disclosed herein the system allows for automatic analysis of potential claim scope with specific Disclosures Selection Criteria and Claim Scope Algorithm that creates a Patent Claim Scope Rating in the form of a set of data indicating potential claim scope of a subject patent. This functionality may be operated by a user or may be otherwise controlled. The user accesses the Claim Scope Evaluator UI by activating a control such as in a User Interface (UI) 401. The user enters, searches for, or selects information about a certain subject patent, granted or pending. Subject patent's information is stored in the system 402.

The system performs searches and extractions using Disclosures Selection Criteria that is:

List patent references that have been cited by the examiner (Applied Art) for the subject patent and store the list locally as Applied Art list.

List backward references for Applied Art patents and store the list locally as Backward 1

List backward references for Backward 1 patents and store the list locally as Backward 2

List forward references for Applied Art patents and store the list locally as Forward 1

Determine the number of patents in Applied Art list and store as Number 1

Merge lists of patents by creating the union of:

All of Applied Arts list

Union of Backward 1 and Backward 2 and Forward 1 and store as BckFwd 1

Sort BckFwd ascending by filing date.

Union of Applied Art list and the first (100–Number 1) patents in the BckFwd list.

Store the merged list locally as Selected Disclosures List. 403

The system selects a set of Claim Scope Algorithms from a library 407 for calculating Sub-Ratings for the subject patent claims' potential scope, the algorithms being:

Sort Selected Disclosures List items by year and patent owner and store the result as a Selected Disclosures Set by year, each year containing a list of patents and owners.

Calculate the closeness of subject patent to patents of first three years by correlating key words between the subject patent and each year's patents; store the correlation values as KWcorr in the Selected Disclosures Set.

The system evaluates selected Claim Scope Algorithms which produces a set of Sub Ratings including one Sub-Rating for each Claim Scope Algorithm used. The system calculates a consolidated Patent Claim Scope Rating for the subject patent by calculating a Patent Claim Scope Rating algorithm for the set of Sub-Ratings 405, the algorithm being:

With the Selected Disclosures Set, calculate how many patents have a have a KWcorr at above 75% of all KWcorr values per year in the Set and store locally for each year.

Calculate a Patent Claim Scope Rating that for this embodiment is a consolidated set of data in form of a matrix with a row for each years in the first column and the number of closely related (KWcorr>75%) patents for each year preceding the subject patent in the second column.

The system outputs a report for the Patent Claim Scope Rating 406.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures usually require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed in various example embodiments.

Example Machine Architecture and Machine-Readable Medium

Figure 6:
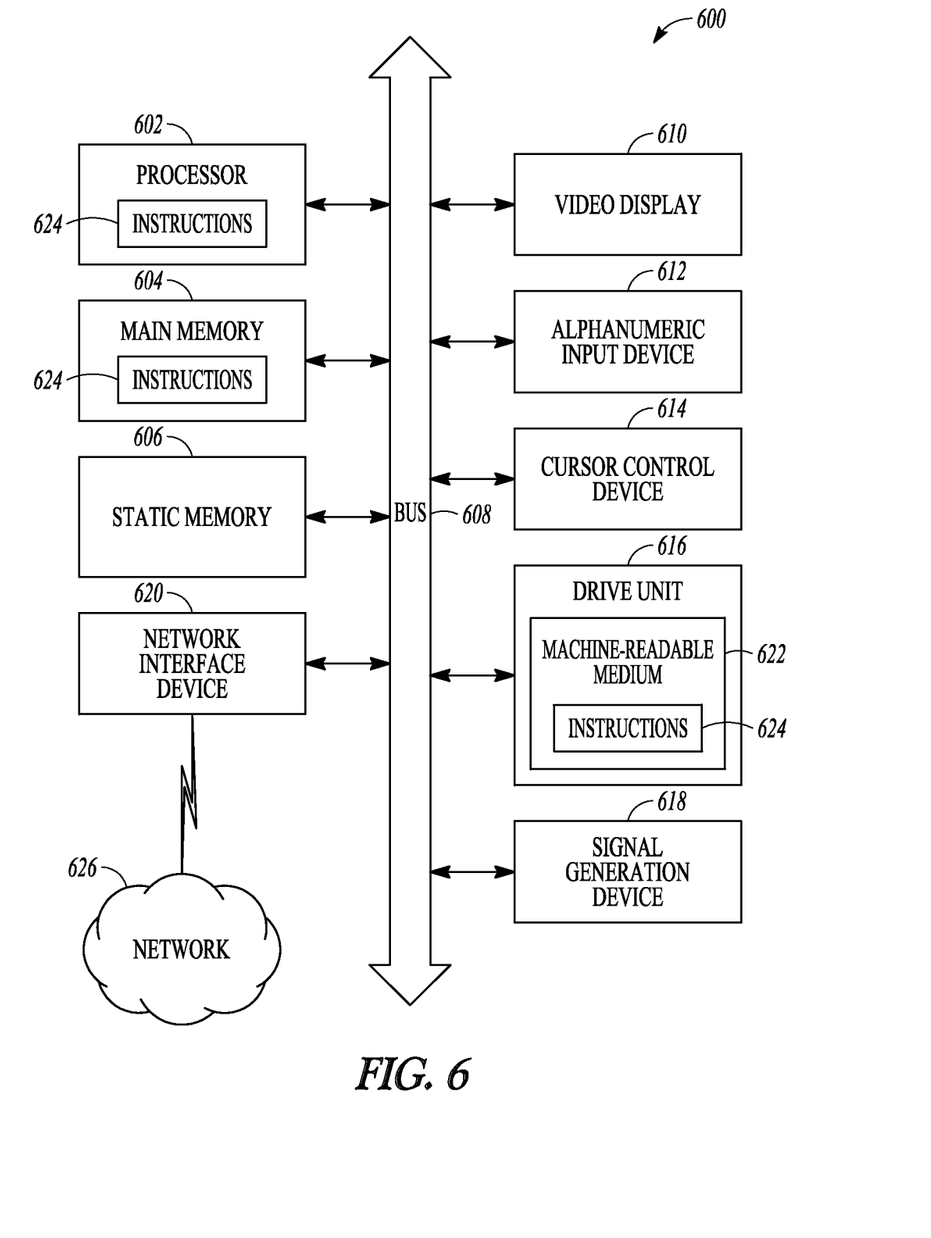
FIG. 6 is a block diagram of a machine in the example form of a computer system within which a set of instructions may be executed for causing the machine to perform any one or more of the methodologies herein discussed.

FIG. 6 is a block diagram of a machine in the example form of a computer system 600 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a PC, a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation or cursor control device 614 (e.g., a mouse), a disk drive unit 616, a signal generation device 618 (e.g., a speaker) and a network interface device 620.

Machine-Readable Medium

The disk drive unit 616 includes a machine-readable medium 622 on which is stored one or more set of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, with the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more data structures or instructions 624. The term "machine-readable medium" shall also be taken to include any tangible medium that is capable of storing, encoding, or carrying instructions for execution by the machine and that cause the machine to perform any one or more of the methodologies of the embodiments of the present invention, or that is capable of storing, encoding or carrying data structures utilized by or associated with such instructions. The term "machine-readable medium" shall accordingly be taken to include, but not be limited to, solid-state memories and optical and magnetic media. Specific examples of machine-readable media include non-volatile memory, including, by way of example, semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 624 may further be transmitted or received over a communications network 626 using a transmission medium. The instructions 624 may be transmitted using the network interface device 620 and any one of a number of well-known transfer protocols (e.g., Hypertext Transfer Protocol "HTTP"). Examples of communication networks include a LAN, a WAN, the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Non-Limiting Embodiments

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method of calculating a patent claim scope rating, the method including:
   receiving from a graphical user interface displayed on a user terminal over a network, a first input containing information about a subject patent;
   receiving from the graphical user interface over the network, a second input including disclosure selection criteria;
   formulating, using at least one processor, a search query using the first input and the second input;
   receiving a search result in response to formulating the search query, the search result including one or more reference documents;
   extracting a set of references from the one or more reference documents included in the search result, the set of references including:
      patent references cited in examination of the subject patent;
      first backward references for the patent references cited in examination of the subject patent;
      second backward references for the first backward references; and
      forward references for the patent references cited in examination of the subject patent;
   calculating a first patent scope sub-rating based on a calculation using a time passed between a priority date of an oldest reference included in a set of prior patent references and a priority data of the subject patent, the set of prior patent references including the patent references, the first backward references, and the second backward references;
   calculating a second patent scope sub-rating based on a calculation using a number of references included in the set of prior patent references;
   calculating a third patent scope sub-rating using a subclass of the subject patent and a subclass of members of the set of prior patent references;
   calculating a fourth patent scope sub-rating based on a calculation using a keyword overlap between a target technology of the subject patent and a set of technology area references, the set of technology area references including the set of prior patent references and the forward references;
   calculating a fifth patent scope sub-rating using a one or more reference relationships between members of the set of prior patent references;
   calculating a patent claim scope rating for the subject patent based on a calculation using the first patent scope sub-rating, the second patent scope sub-rating, the third patent scope sub-rating, the fourth patent scope sub-rating, and the fifth patent scope sub-rating;
   generating, for output on the graphical user interface, a patent claim scope report including the patent claim scope rating; and
   transmitting, to the graphical user interface displayed on the user terminal over the network, the patent claim scope rating report.

2. The method of claim 1, further comprising:
   calculating a sixth patent scope sub-rating using a number of patent disclosures in an art context of the subject patent filed prior to the subject patent; and
   wherein calculating the patent claim scope rating includes using the sixth patent scope sub-rating.

3. The method of claim 1, further comprising:
   calculating a sixth patent scope sub-rating using a number of patents, cited by an examiner in examination of the subject patent, the first backward references, the second backward references, and the forward references; and
   wherein calculating the patent claim scope rating includes using the sixth patent scope sub-rating.

4. The method of claim 1, further comprising:
   calculating a sixth patent scope sub-rating using reference relationships between the subject patent, patents filed after the subject patent, and patent applications filed after the subject patent; and
   wherein calculating the patent claim scope rating includes using the sixth patent scope sub-rating.

5. A system to calculate a patent claim scope rating, the system comprising:
   at least one processor; and
   a memory including instruction that, when executed by the at least one processor, cause the at least one processor to perform operations to:
      receive from a graphical user interface displayed on a user terminal over a network, a first input containing information about a subject patent;
      receive from the graphical user interface over the network, a second input including disclosure selection criteria;
      formulate a search query using the first input and the second input;
      receive a search result in response to the formulation of the search query, the search result including one or more reference documents;
      extract a set of references from the one or more reference documents included in the search result, the set of references including:
         patent references cited in examination of the subject patent;
         first backward references for the patent references cited in examination of the subject patent;
         second backward references for the first backward references; and
         forward references for the patent references cited in examination of the subject patent;
      calculate a first patent scope sub-rating based on a calculation using a time passed between a priority date of an oldest reference included in a set of prior patent references and a priority data of the subject patent, the set of prior patent references including the patent references, the first backward references, and the second backward references;
      calculate a second patent scope sub-rating based on a calculation using a number of references included in the set of prior patent references;
      calculate a third patent scope sub-rating using a subclass of the subject patent and a subclass of members of the set of prior patent references;
      calculate a fourth patent scope sub-rating based on a calculation a keyword overlap between a target technology of the subject patent and a set of technology area references, the set of technology area references including the set of prior patent references and the forward references;
      calculate a fifth patent scope sub-rating using one or more reference relationships between members of the set of prior patent references;
      calculate a patent claim scope rating for the subject patent using the first patent scope sub-rating, the second patent scope sub-rating, the third patent scope sub-rating, the fourth patent scope sub-rating, and the fifth patent scope sub-rating;

generate, for output on the graphical user interface; a patent claim scope report including the patent claim scope rating; and transmit, to the graphical user interface displayed on the user terminal over the network, the patent claim scope rating report.

6. The system of claim 5, further comprising operations to:

calculate a sixth patent scope sub-rating using a number of patent disclosures in an art context of the subject patent filed prior to the subject patent; and wherein the operations to calculate the patent claim scope rating include using the sixth patent scope sub-rating in the calculation.

7. The system of claim 5, further comprising operations to:

calculating a sixth patent scope sub-rating use a number of patents, cited by an examiner in examination of the subject patent, the first backward references, the second backward references, and the forward references; and wherein the operations to calculate the patent claim scope rating include using the sixth patent scope sub-rating in the calculation.

8. The system of claim 5, further comprising operations to:

calculating a sixth patent scope sub-rating use reference relationships between the subject patent, patents filed after the subject patent, and patent applications filed after the subject patent; and wherein the operations to calculate the patent claim scope rating include using the sixth patent scope sub-rating in the calculation.

9. A machine readable medium, including instructions, which when performed by a machine, cause the machine to perform operations comprising:

receiving from a graphical user interface displayed on a user terminal over a network, a first input containing information about a subject patent;

receiving from the graphical user interface over the network, a second input including disclosure selection criteria;

formulating, using at least one processor, a search query using the first input and the second input;

receiving a search result in response to formulating the search query, the search result including one or more reference documents;

extracting a set of references from the one or more reference documents included in the search result, the set of references including:

patent references cited in examination of the subject patent;

first backward references for the patent references cited in examination of the subject patent;

second backward references for the first backward references; and forward references for the patent references cited in examination of the subject patent;

calculating a first patent scope sub-rating based on a calculation using a time passed between a priority date of an oldest reference included in a set of prior patent references and a priority data of the subject patent, the set of prior patent references including the patent references, the first backward references, and the second backward references;

calculating a second patent scope sub-rating based on a calculation using a number of references included in the set of prior patent references;

calculating a third patent scope sub-rating using a subclass of the subject patent and a subclass of members of the set of prior patent references;

calculating a fourth patent scope sub-rating based on a calculation using a keyword, overlap between a target technology of the subject patent and a set of technology area references, the set of technology area references including the set of prior patent references and the forward references;

calculating a fifth patent scope sub-rating using one or more reference relationships between members of the set of prior patent references;

calculating a patent claim scope rating for the subject patent using the first patent scope sub-rating, the second patent scope sub-rating, the third patent scope sub-rating, the fourth patent scope sub-rating, and the fifth patent scope sub-rating;

generating, for output on the graphical user interface; a patent claim scope report including the patent claim scope rating; and transmitting, to the graphical user interface displayed on the user terminal over the network, the patent claim scope rating report.

10. The medium of claim 9, the operations further comprising:

calculating a sixth patent scope sub-rating using a number of patent disclosures In an art context of the subject patent filed prior to the subject patent; and wherein the operations for calculating the patent claim scope rating include using the sixth patent scope sub-rating in the calculation.

11. The medium of claim 9, the operations further comprising:

calculating a sixth patent scope sub-rating using a number of patents, cited by an examiner in examination of the subject patent, the first backward references, the second backward references, and the forward references; and wherein the operations for calculating the patent claim scope rating include using the sixth patent scope sub-rating in the calculation.

12. The medium of claim 9, the operations further comprising:

calculating a sixth patent scope sub-rating using reference relationships between the subject patent, patents filed after the subject patent, and patent applications filed after the subject patent; and wherein the operations for calculating the patent claim scope rating include using the sixth patent scope sub-rating in the calculation.

* * * * *

UNITED STATES PATENT AND TRADEMARK OFFICE
CERTIFICATE OF CORRECTION

PATENT NO. : 9,767,190 B2  
APPLICATION NO. : 14/259900  
DATED : September 19, 2017  
INVENTOR(S) : Lundberg et al.

Page 1 of 1

It is certified that error appears in the above-identified patent and that said Letters Patent is hereby corrected as shown below:

In the Claims

In Column 23, Line 1, in Claim 5, delete "interface;" and insert --interface,-- therefor In Column 24, Line 13, in Claim 9, delete "keyword," and insert --keyword-- therefor In Column 24, Line 26, in Claim 9, delete "interface;" and insert --interface,-- therefor In Column 24, Line 36, in Claim 10, delete "In" and insert --in-- therefor Signed and Sealed this  
Sixteenth Day of July, 2019

Andrei Iancu  
*Director of the United States Patent and Trademark Office*